(12) United States Patent
Komiya et al.

(10) Patent No.: US 8,493,070 B2
(45) Date of Patent: Jul. 23, 2013

(54) DEVICE AND METHOD FOR MEASURING VIBRATION CHARACTERISTICS OF HARD DISK SUSPENSION

(75) Inventors: Hiroshi Komiya, Gyoda (JP); Tatsuhiko Nishida, Aiko-gun (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 391 days.

(21) Appl. No.: 12/835,057

(22) Filed: Jul. 13, 2010

(65) Prior Publication Data
US 2011/0019521 A1    Jan. 27, 2011

(30) Foreign Application Priority Data
Jul. 22, 2009   (JP) ................... 2009-171454

(51) Int. Cl.
*G01R 31/08* (2006.01)
*G01R 27/26* (2006.01)

(52) U.S. Cl.
USPC .......................... 324/519; 324/661

(58) Field of Classification Search
USPC .......................... 324/661, 681, 519
See application file for complete search history.

(56) References Cited

U.S. PATENT DOCUMENTS

| | | | |
|---|---|---|---|
| 6,714,386 B1 * | 3/2004 | Polycarpou et al. | 360/265.1 |
| 7,199,960 B1 * | 4/2007 | Schreck et al. | 360/75 |
| 7,450,333 B2 * | 11/2008 | Hirano et al. | 360/75 |
| 7,729,079 B1 * | 6/2010 | Huber | 360/75 |

FOREIGN PATENT DOCUMENTS
JP    2007-192735 A    8/2007

OTHER PUBLICATIONS

B. Thornton et al; A Novel HDD "Component-Level" Operational-Shock Measurement Method; IEEE Transactions on Magnetics. vol. 43, No. 6, Jun. 2007.

* cited by examiner

*Primary Examiner* — Amy He
(74) *Attorney, Agent, or Firm* — Holtz, Holtz, Goodman & Chick, P.C.

(57) ABSTRACT

The signal source generates a signal of a frequency higher than the vibration frequency of the slider of the hard disk drive, and supplies it to one end of the slider and the disk of the hard disk drive. The detector detects a signal output from the other end of the slider and the disk, and outputs a change in the capacitance between the slider and the disk as a voltage when the hard disk drive receives an impact.

6 Claims, 12 Drawing Sheets

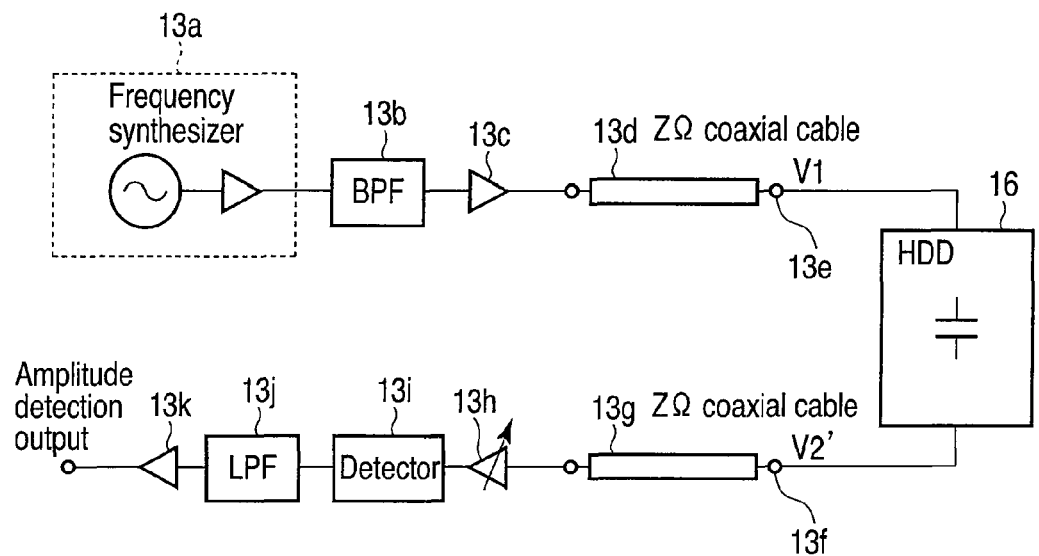
F I G. 2
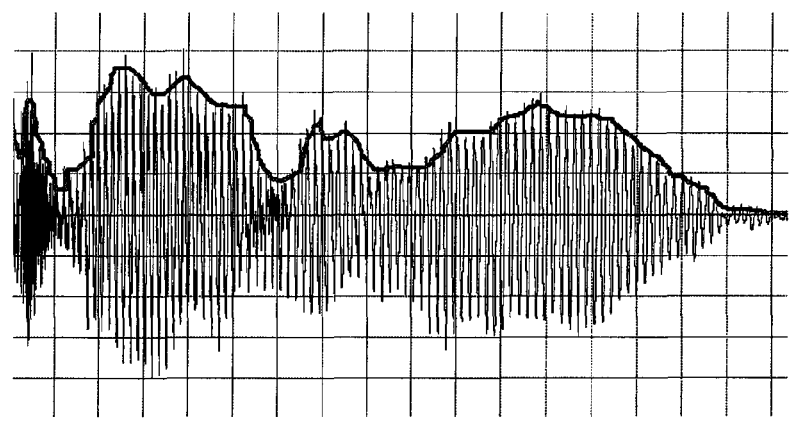
F I G. 3

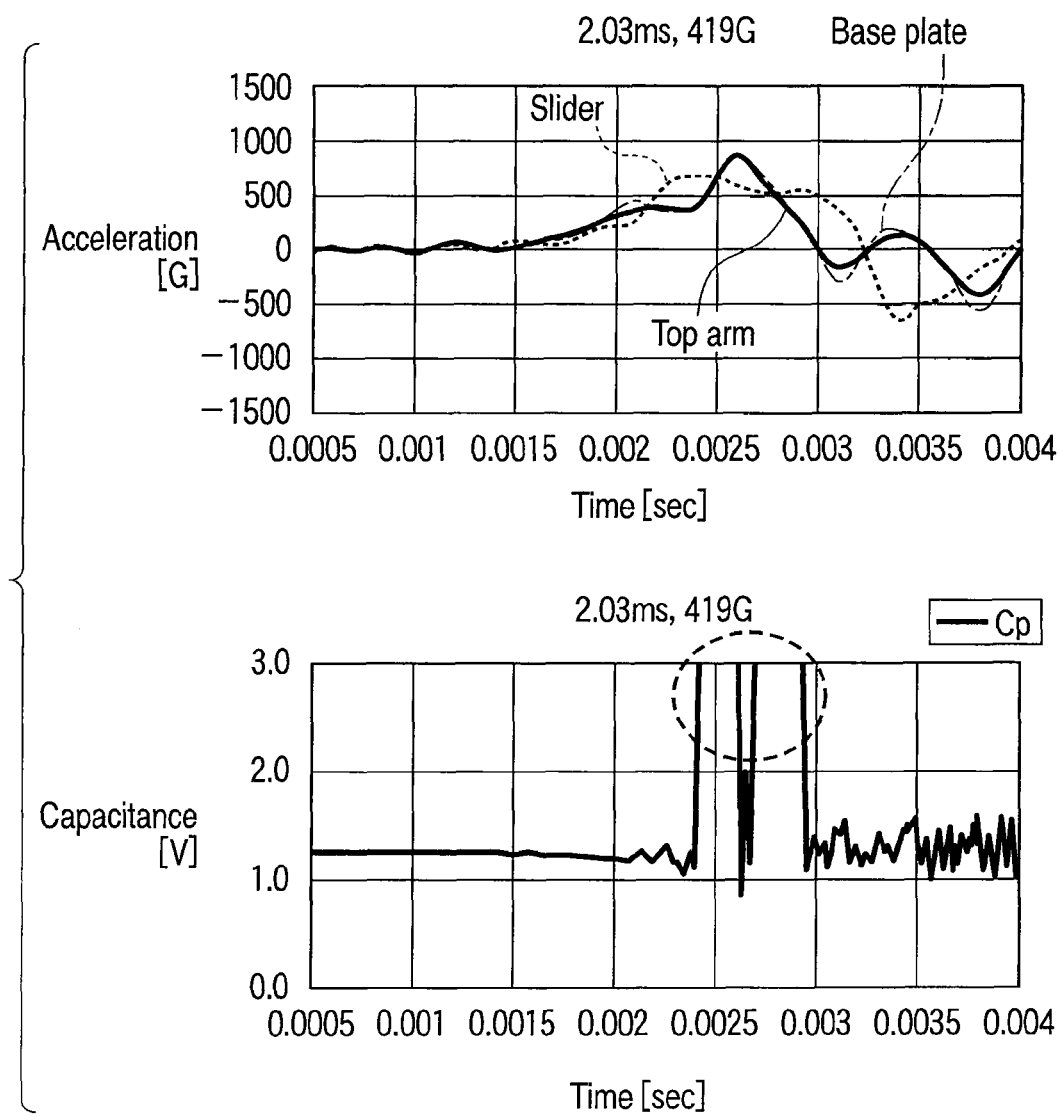
F I G. 8A

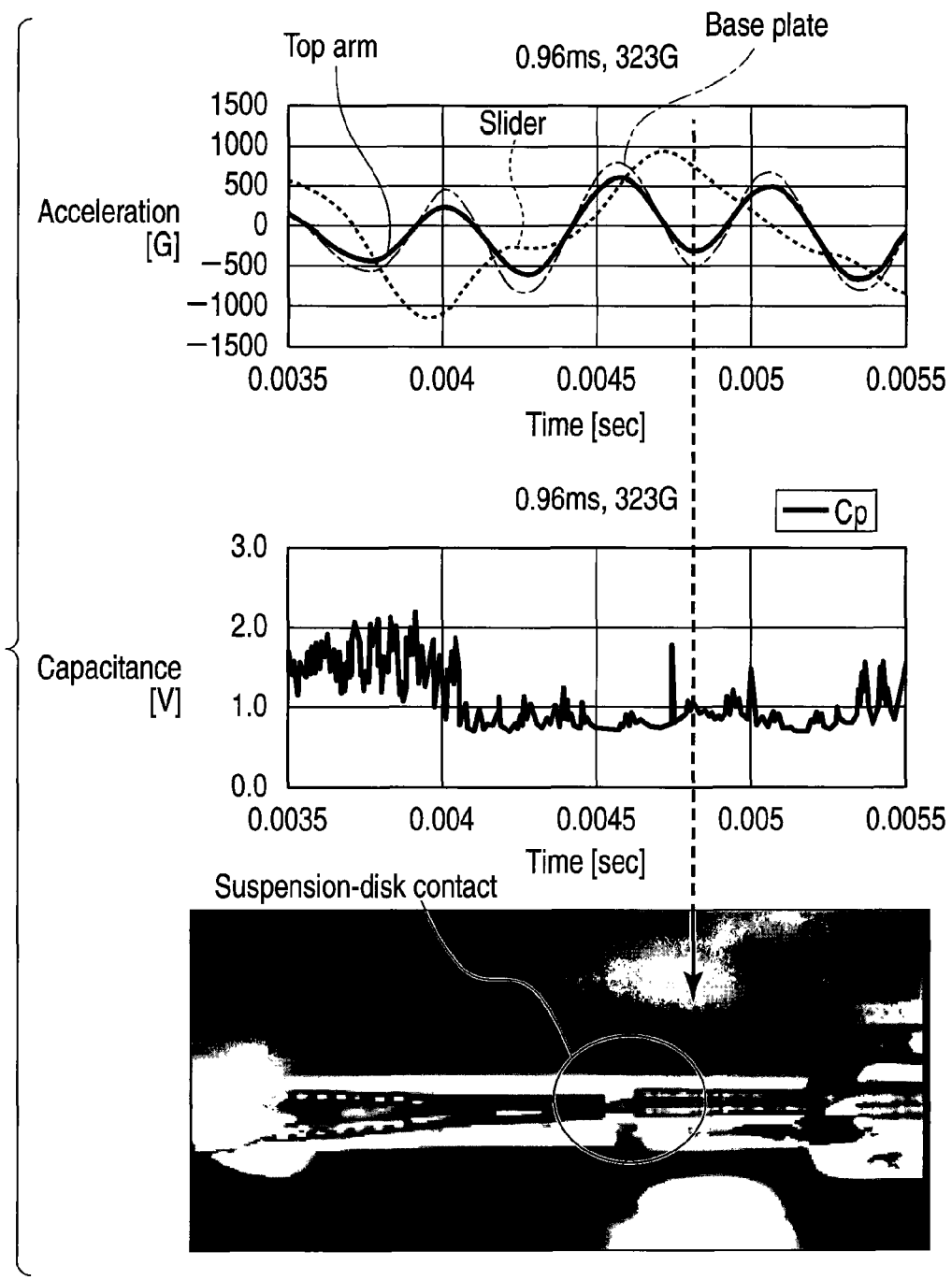
F I G. 9B

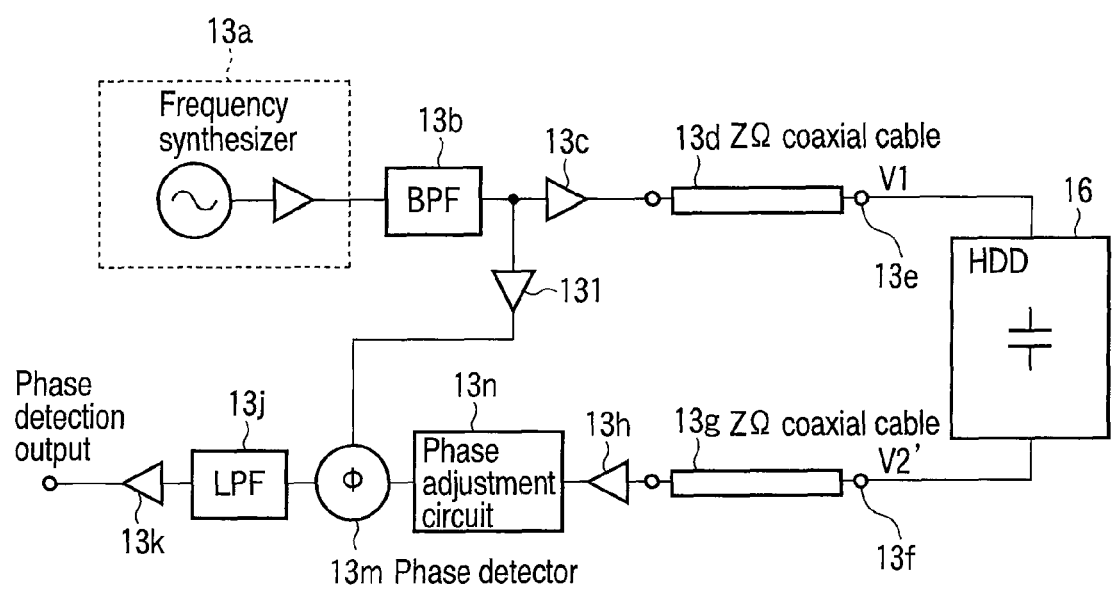
F I G. 10

DEVICE AND METHOD FOR MEASURING VIBRATION CHARACTERISTICS OF HARD DISK SUSPENSION

CROSS-REFERENCE TO RELATED APPLICATIONS

This application is based upon and claims the benefit of priority from prior Japanese Patent Application No. 2009-171454, filed Jul. 22, 2009, the entire contents of which are incorporated herein by reference.

BACKGROUND OF THE INVENTION

1. Field of the Invention

The embodiments of the present invention relate to a vibration characteristics measurement apparatus and method for measuring vibrations produced in a suspension or the like of a hard disk drive (hereinafter referred to as an HDD).

2. Description of the Related Art

An HDD has been used for a wide range of applications by a wide range of users. For this reason, the HDD may be used in harsh environments, and thus high reliability of impact resistance is required. Improvement of the impact resistance performance therefore has been required more strongly than ever before.

The HDD incorporates a suspension to write and reproduce information to and from a rotating disk. The suspension is provided at the tip portion of an arm, and a slider that constitutes a magnetic head is provided at the tip portion of the suspension. When the HDD receives an impact, forcing the slider and the suspension into contact with a disk and leaving a flaw on the disk surface, it may lead to performance degradation of the HDD. Thus, the behaviors of the slider and the suspension need to be evaluated when the HDD receives an impact. The conventional methods of evaluating the impact resistance of the HDD slider and suspension include the following published technologies:

(1) Observation of the behavior of the slider during an impact by use of a high-speed camera;
(2) Measurement of the behavior of the slider during an impact by use of a Doppler vibration meter (see Jpn. Pat. Appln. KOKAI Publication No. 2007-192735, for example);
(3) Observation of a flaw created on a disk surface after an impact; and
(4) Observation of changes in the distance between the slider and a disk during an impact through the observation of dynamic changes in the capacitance (see A Novel HDD "Component-Level" Operational-Shock Measurement Method [IEEE Transaction of Magnetics, Vol. 43, No. 6, June 2007], for example).

According to the evaluation methods 1, 2 and 3, how much the slider is lifted from the disk because of the force of the impact (slider lift-off level) is measured. The lift-off amount of the slider, however, is as small as the order of 10 nm, and thus it has been very difficult to accurately evaluate a level at which no lift-off of the slider occurs, i.e., whether there is any slight change in the lift-off amount of the slider and whether the slider makes contact with the disk during the impact. Furthermore, it has been difficult to measure any change in the distance between the slider and the disk during the impact when the HDD is operating.

Moreover, according to the technology (4) of observing the capacitance, the HDD is connected to a capacitance meter, which tends to be a test that utilizes costly general-purpose measurement devices in combination. The capacitance can be measured by a general LCR meter. However, the measurement speed of a commercial LCR meter that is designed to measure a static capacitance is 200 Hz (5 ms) at most. For this reason, it is difficult to measure the behavior of a slider having a vibration frequency of 100 to 200 KHz through a change in the dynamic capacitance with such a meter.

Hence, a vibration characteristics measurement apparatus and method that can accurately measure vibrations caused in the suspension or the like of the HDD during an impact have been demanded.

BRIEF SUMMARY OF THE INVENTION

According to a first aspect of the invention, there is provided a vibration characteristics measurement apparatus comprising: a signal source configured to generate a signal of a frequency higher than a vibration frequency of a slider of a hard disk drive, the signal being supplied to one end of the slider and a disk of the hard disk drive; a detector configured to detect a signal output from the other end of the slider and the disk and output a change in a capacitance between the slider and the disk as a voltage when the hard disk drive receives an impact.

According to a second aspect of the invention, there is provided a vibration characteristics measurement method comprising: supplying a signal of a frequency higher than a vibration frequency of a slider of a hard disk drive to one end of the slider and a disk of the hard disk drive; and conducting a detection of a signal output from the other end of the slider and the disk, and measuring a change in a capacitance between the slider and the disk as a voltage when the hard disk drive receives an impact.

BRIEF DESCRIPTION OF THE SEVERAL VIEWS OF THE DRAWING

FIG. 2 is a diagram of an example circuit structure of a capacitance detector illustrated in FIG. 1.

FIG. 3 is a diagram of envelope detection.

FIGS. 8A and 8B are characteristics diagrams indicating the relationship between changes in the capacitance during an impact when the slider is not lifted off and the motion tracking of the arm and the like according to the present embodiment.

FIGS. 9A and 9B are diagrams showing the relationship between a contact of the suspension with the disk during an impact and changes in the capacitance according to the present embodiment, along with high-speed camera images.

FIG. 10 is a diagram of another example circuit structure of the capacitance detector illustrated in FIG. 1.

DETAILED DESCRIPTION OF THE INVENTION

The embodiment will be explained below with reference to the attached drawings.

First, the principle of the present embodiment will be explained.

Figure 4:
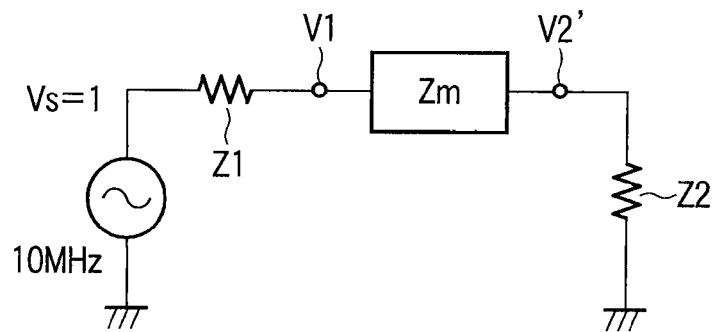
FIG. 4 is an equivalent circuit schematic for explaining the principle of the embodiment.

According to the present embodiment, a change in the capacitance between, for example, the slider and a disk of an HDD is detected as a change in voltage. As illustrated in FIG. 4, the slider and the disk of the HDD are assumed as a capacitor Zm. When a sine-wave signal of the signal source frequency of 10 MHz and the amplitude Vs=1, for example, is supplied to the capacitor Zm from an output impedance Z1, and the output of the capacitor Zm is received by an input impedance Z2. When a signal of the first terminal of the capacitor is V1 and a signal of the second terminal is V2', the known S21 transmission characteristics are given by:

$$S21 = V2'/V1$$

Figure 5:
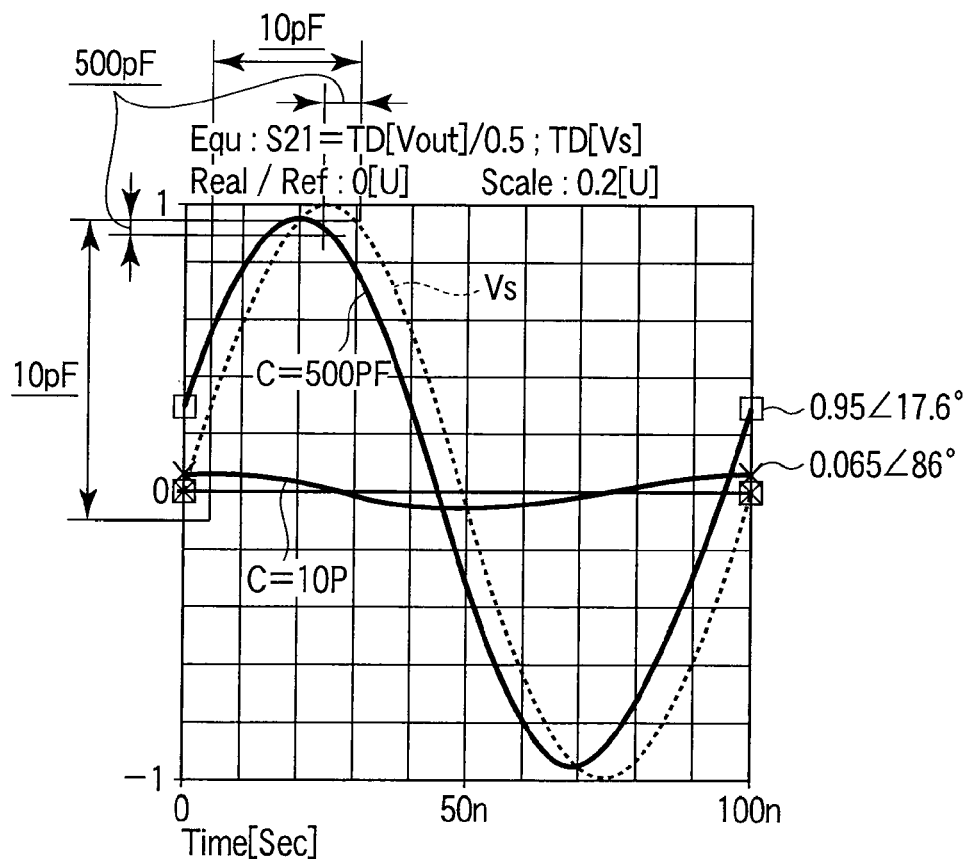
FIG. 5 is a plot for explaining the principle of the present embodiment.

Here, if the input/output impedance Z1=Z2, and, for example, the capacitance of the capacitor Zm is Cp=500 pF (estimated capacitance immediately before the slider of the HDD comes into contact with a disk) and Cp=10 pF (estimated capacitance when the slider of the HDD is lifted from the disk during an impact), a simulation conducted in accordance with the above conditions delivers a result of the S21 transmission characteristics as shown in FIG. 5. More specifically, the S21 transmission characteristics of the capacitances are:

When Cp=500 pF, S21=0.95, phase lag 17.6°
When Cp=10 pF, S21=0.065, phase lag 86°

As shown above, reduction of the S21 amplitude characteristics and phase leading occur in accordance with the capacitances. To convert the amount of change in the capacitance caused by the mechanical vibrations of the HDD slider to an electrical signal, a change in the amplitude of signal V2' of the second terminal or in the phase of signal V2', or changes in both the amplitude and phase of signal V2' should be detected.

EMBODIMENTS

Figure 1:
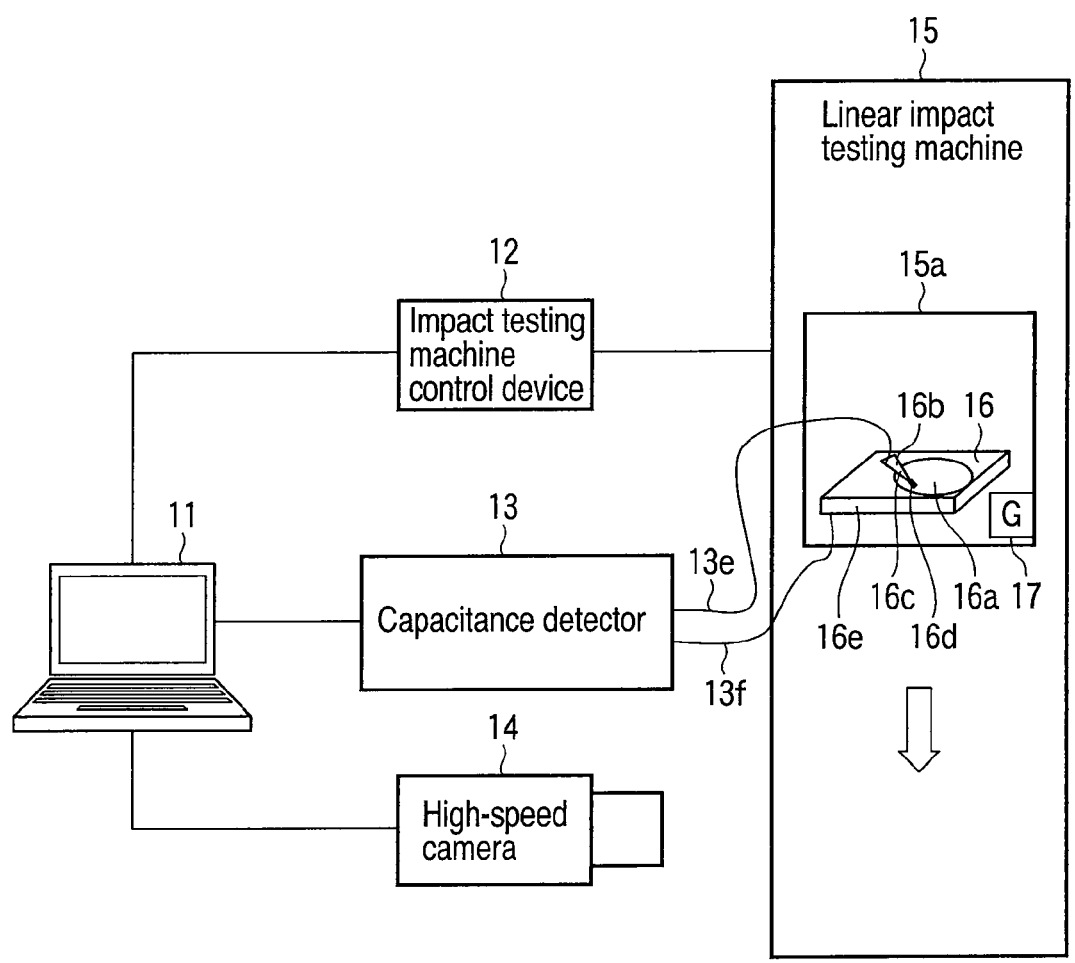
FIG. 1 is a diagram of the structure of a vibration characteristics measurement apparatus according to an embodiment.

FIG. 1 shows a vibration characteristics measurement apparatus according to the present embodiment. For example, a control unit 11 constituted by a personal computer controls the operation of the entire apparatus. The control unit 11 is connected to, for example, an impact testing machine control device 12, a capacitance detector 13 and a high-speed camera 14. The impact testing machine control device 12 controls a linear impact testing machine 15 based on the control performed by the control unit 11. The linear impact testing machine 15 includes a stage 15a, on which an HDD that is a target test device is mounted. The linear impact testing machine 15 drops the stage 15a from a predetermined height, based on the control performed by the impact testing machine control device 12. The stage 15a is provided with an acceleration sensor (G sensor) 17, which detects the acceleration of the falling of the stage 15a. The output signal of the G sensor 17 is supplied to the control unit 11 by means of the impact testing machine control device 12, for example.

The capacitance detector 13 detects, based on the control performed by the control unit 11, a change in the capacitance between the disk 16a and the slider 16d of the HDD 16 as a change in voltage. In the HDD 16, a suspension 16c is arranged at the tip portion of the arm 16b. The slider 16d that constitutes a magnetic head is arranged at the tip of the suspension 16c. When the disk 16a rotates at a high speed, an air bearing is formed between the disk 16a and the slider 16d. Thus, the slider 16d is lifted approximately 10 nm from the disk 16a. The slider 16d is formed of metal, while the head is formed of silicon. The surface of the disk 16a that is a magnetic disk is coated with a diamond-like carbon (DLC) film. The slider 16d and the disk 16a thereby form a capacitor.

The first terminal of the capacitance detector 13 is connected, for example, to the suspension 16c of the HDD 16. The suspension 16c, the slider 16d and the arm 16b are formed of metal and thus electrically connected to one another. For this reason, in the measurement of the present embodiment, the suspension 16c and the arm 16b are electrically insulated from each other, and the slider 16d including the suspension 16c is regarded as an electrode of the capacitor. Moreover, the second terminal is connected, for example, to the metal casing 16e of the HDD 16. The disk 16a is rotatably mounted in the casing 16e by means of a not-illustrated spindle that is provided at its center, and the disk 16a and the casing 16e are electrically connected to each other by means of the spindle. Because they have small resistances, the disk 16a is regarded as the other electrode of the capacitor.

In this situation, the amount of a momentary change in the capacitance between the slider and the disk can be detected by applying a signal having a stable amplitude and frequency to the space between the slider and the disk and detecting a slight change in the amplitude of the output signal, as described later. The detection signal of the capacitance detector 13 is supplied to the control unit 11.

The high-speed camera 14 is arranged at a position where the stage 15a of the linear impact testing machine 15 is dropped. The high-speed camera 14 takes images of the behaviors of the slider 16d or the like in the HDD 16 that is mounted onto the stage 15a, at the drop point under the control performed by the control unit 11. The output signal of the high-speed camera 14 is converted, for example, to a digital signal, and supplied to the control unit 11.

The G sensors may be attached to the arm 16b, the suspension 16c and the slider 16d of the HDD 16, if necessary, so that the accelerations of these elements can be measured.

FIG. 2 shows an example of the capacitance detector 13. This capacitance detector 13 comprises, for example, a frequency synthesizer 13a that serves as an oscillator, a band-pass filter (BPF) 13b, an amplifier 13c, coaxial cables 13d and 13g, the first terminal 13e, the second terminal 13f, a level adjustment circuit 13h, a detector 13i, a low-pass filter (LPF) 13j, and an amplifier 13k.

The frequency synthesizer 13a outputs a signal of a frequency 50 to 100 times higher than the vibration frequency of the slider 16d of the HDD 16. More specifically, a sine-wave signal of, for example, 5 to 10 MHz is output. The signal of a stable frequency that is output by the frequency synthesizer 13a is supplied to the BPF 13b, where unnecessary signals are eliminated. The output signal of the BPF 13b is output as a necessary amplitude from the amplifier 13c of an output impedance ZΩ (e.g., 50Ω) and supplied to the slider 16d of the HDD 16 by means of the ZΩ (50Ω) coaxial cable 13d and the first terminal 13e.

Furthermore, the signal of the second terminal 13f connected to the casing 16e of the HDD 16 is supplied to the level adjustment circuit 13h having an input impedance ZΩ (50Ω) by means of the ZΩ (e.g., 50Ω) coaxial cable 13g. The signal whose level is adjusted by this level adjustment circuit 13h is supplied to the detector 13i. The level is adjusted in such a manner that the amplitude detector output level obtained by disconnecting the HDD 16 from the terminal 13e and the terminal 13f and short-circuiting between these terminals becomes a reference value, such as "1". The reference value should be set in a range that the signal would not become too large to saturate the detector 13i or not too small to damage the dynamic range of the detector characteristics. The signal whose level is adjusted by the level adjustment circuit 13h is supplied to the detector 13*i*. The detector 13*i* may be an envelope detector. As indicated in FIG. 3, the signal obtained by the second terminal 13*f* uses the signal output by the frequency synthesizer 13*a* as a carrier, and its amplitude is modulated in accordance with a change in the capacitance between the slider 16*d* and the disk 16*a*. The detector 13*i* detects this amplitude-modulated signal. The output signal of the detector 13*i* is converted to a low-frequency voltage signal by the LPF 13*j*, and supplied to the control unit 11 by means of the amplifier 13*k*.

The operation of the above structure is now explained.

Based on the control performed by the control unit 11 indicated in FIG. 1, the capacitance detector 13 applies a sine-wave signal having, for example, a frequency of 5 MHz and an effective value of +10 dBm to the slider 16*d* of the HDD 16. In the HDD 16, the disk 16*a* is being rotated, and the slider 16*d* is moved onto the disk 16*a*. In this situation, based on the control of the impact testing machine control device 12, the stage 15*a* of the impact testing machine control device 15 is dropped from a predetermined height so that an impact is applied to the HDD 16 because of the predetermined acceleration. The capacitance detector 13 checks the signal of the second terminal 13*f*, and detects a change in the capacitance between the slider 16*d* and the disk 16*a* of the HDD 16 during the impact, as a change in voltage. Furthermore, the high-speed camera 14 takes an image of the slider 16*d* and the disk 16*a* of the HDD 16 during the impact. The output signals of the capacitance detector 13 and the high-speed camera 14 are supplied to the control unit 11. The control unit 11 processes these input signals in accordance with a known signal processing program and displays the results, for example, on the display.

Figures 6A, 6B:
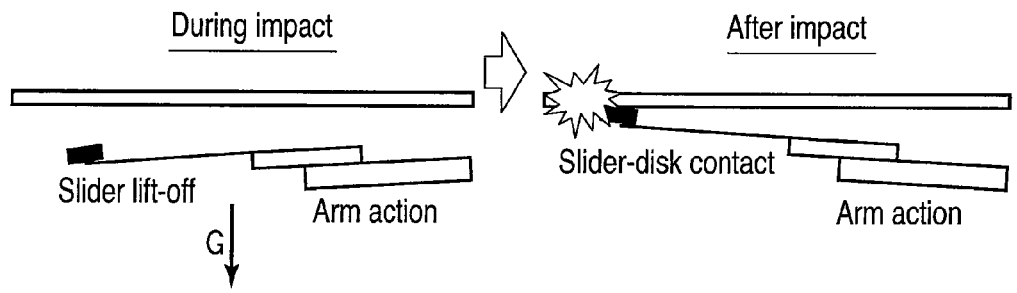
FIGS. 6A, 6B, 6C and 6D are diagrams for explaining the behaviors of an arm during and after an impact.
Figures 6C, 6D:
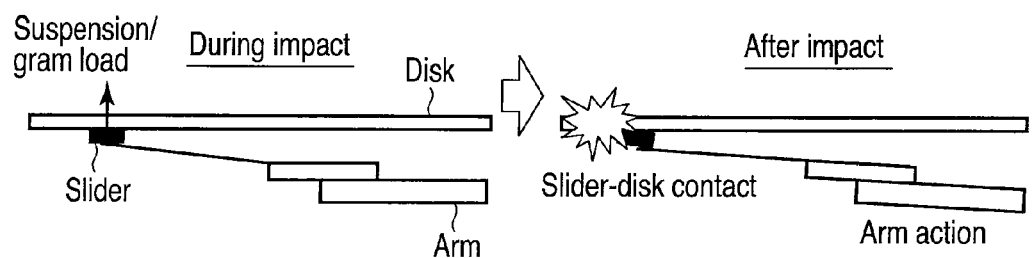

FIGS. 6A to 6D show examples of the slider and the disk in contact mode. FIGS. 6A and 6B represent a contact mode that can be observed by a high-speed camera, whereas FIGS. 6C and 6D represent a contact mode that can be determined on the basis of a change in capacitance. FIG. 6A shows the behavior of the HDD during an impact. When the HDD receives the impact, the arm moves in a direction separate from the disk, and thus the head is lifted off. Thereafter, as illustrated in FIG. 6B, the arm moves back toward the disk, and the head comes into contact with the disk. Such large behaviors of the arm and the head can be observed by a high-speed camera.

However, as indicated in FIG. 6C, when the HDD receives an impact but the load applied to the arm and the head is not heavy enough to lift the head off as illustrated in FIG. 6A, the head may still come into contact with the disk as illustrated in FIG. 6D. Such slight behaviors of the arm and the head are difficult to observe with a high-speed camera.

Figure 7A:
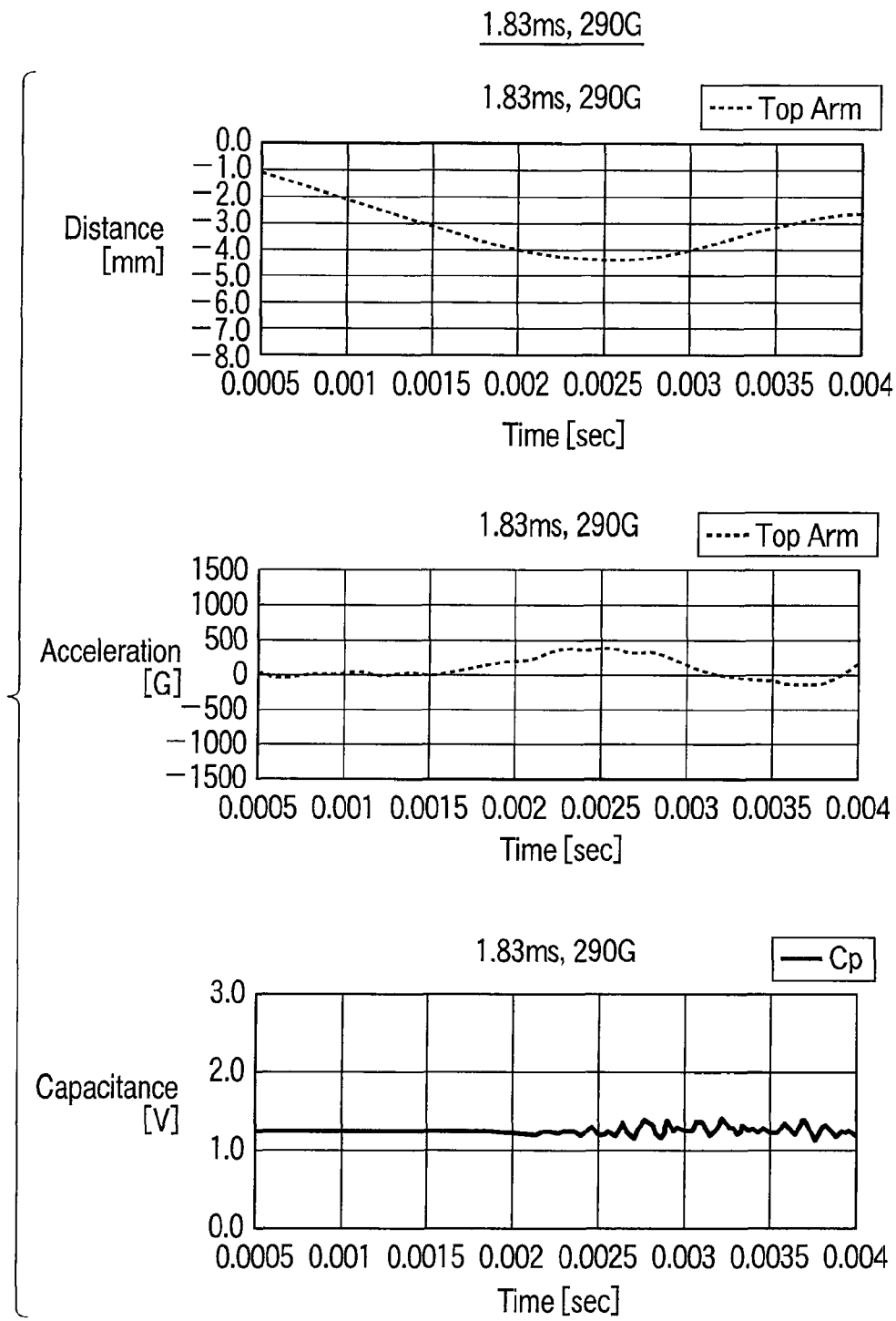
FIGS. 7A, 7B and 7C are characteristics diagrams indicating changes in the capacitance during an impact when the slider is not lifted off, as well as distances and accelerations, according to the present embodiment.
Figure 7B:
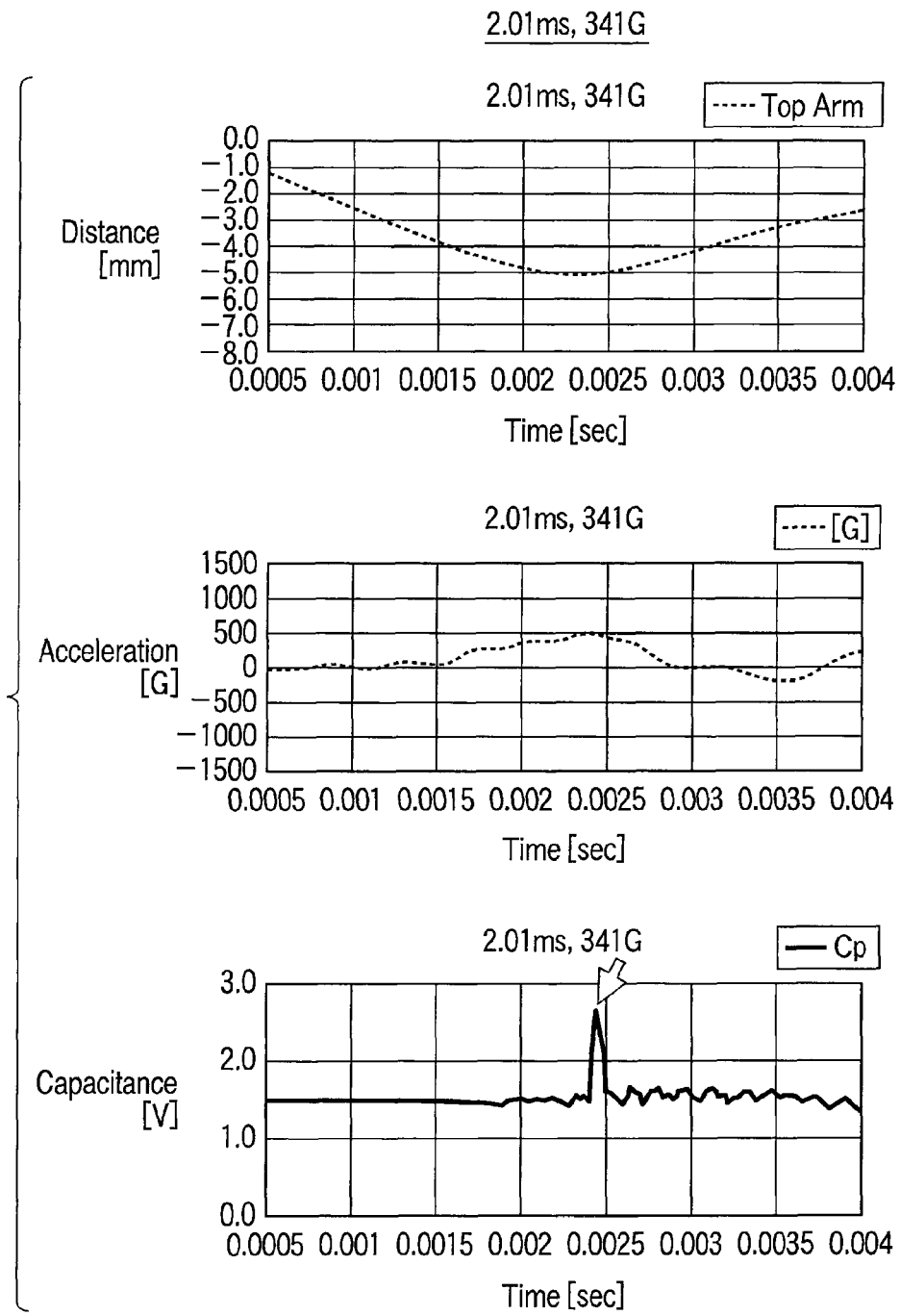
Figure 7C:
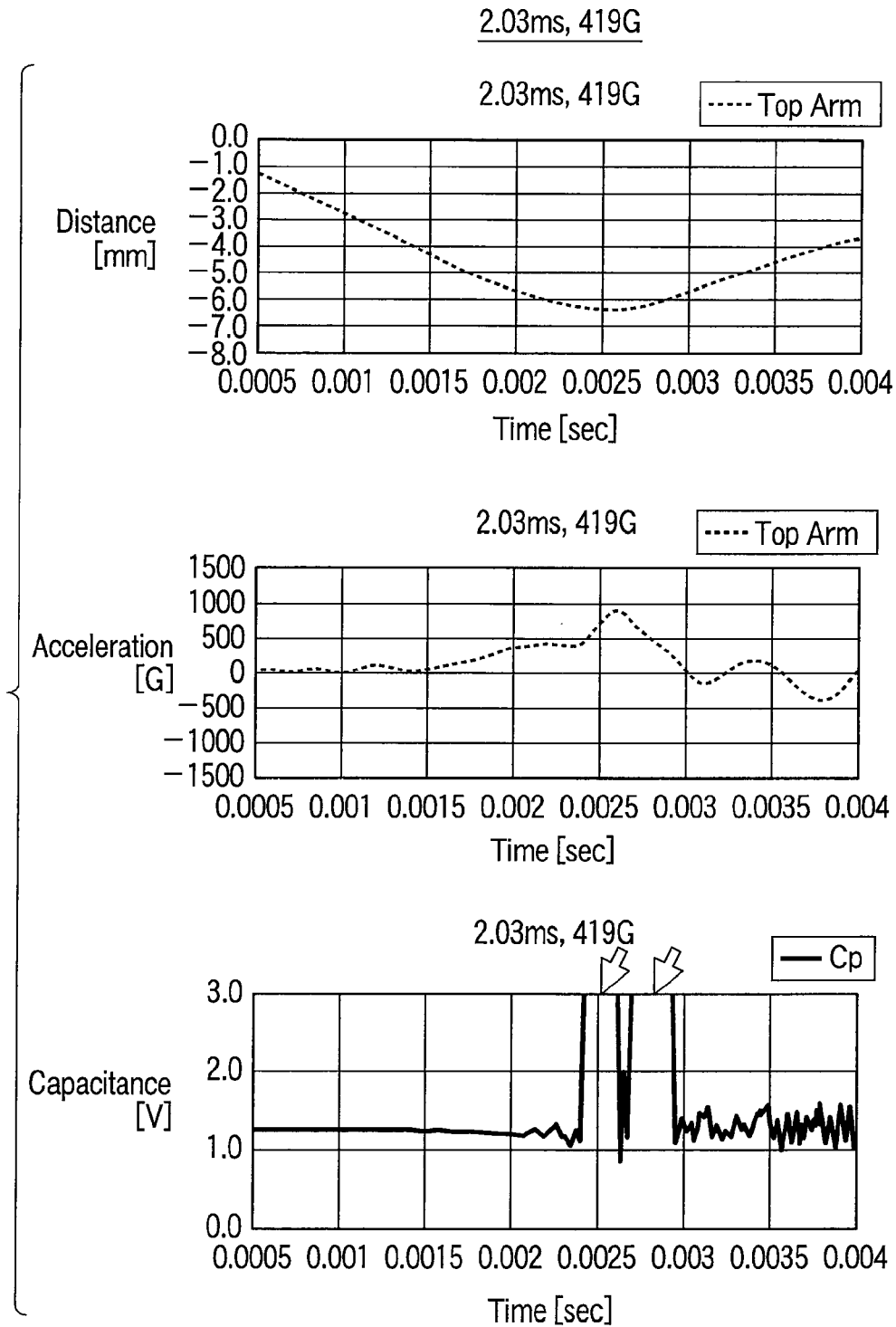

FIGS. 7A, 7B and 7C show the capacitance between the disk and the slider that is measured by changing the acceleration applied to the HDD 16. In each of FIGS. 7A, 7B and 7C, an impact of a level at which no slider lift-off is caused is given to the HDD 16. In FIGS. 7A, 7B and 7C, the distance represents the displacement of the arm (top arm), and the acceleration represents the acceleration exerted on the arm. In addition, the capacitance is expressed in terms of voltage (V).

FIG. 7A shows changes in the capacitance between the disk and the slider when the duration of the impact is 1.83 ms and the acceleration is 290 G. Here, there are only slight changes in the capacitance in accordance with changes in acceleration so that the slider does not come into contact with the head.

FIG. 7B shows changes in the capacitance between the disk and the slider when the duration is 2.01 ms and the acceleration is 341 G. Here, when the acceleration reaches its peak, a large peak appears in the changes of the capacitance, as indicated by an arrow in the drawing. At this moment, although there is no lift-off of the slider, the disk surface has been visually checked after the test to find a surface flaw on the disk. Thus, it can be determined that the slider has come into contact with the head.

FIG. 7C shows changes in the capacitance between the disk and the slider when the duration is 2.03 ms and the acceleration is 419 G. Here, two large peaks appear in the capacitance, as indicated by arrows in the drawing, when the acceleration drastically changes. Again, although there is no lift-off of the slider at this moment, the disk surface has been visually checked after the test to find a surface flaw on the disk. Thus, it can be determined that the slider has come into contact with the head.

With the conventional measurement by use of a high-speed camera, it has been difficult to detect a contact of the slider with the disk when the slider is not lifted off during an impact.

In contrast, according to the present embodiment, even when the slider is not lifted off during an impact as indicated in FIGS. 7B and 7C, the contact of the slider with the disk is still detectable by detecting changes in the capacitance between the slider and the disk.

Figure 8B:
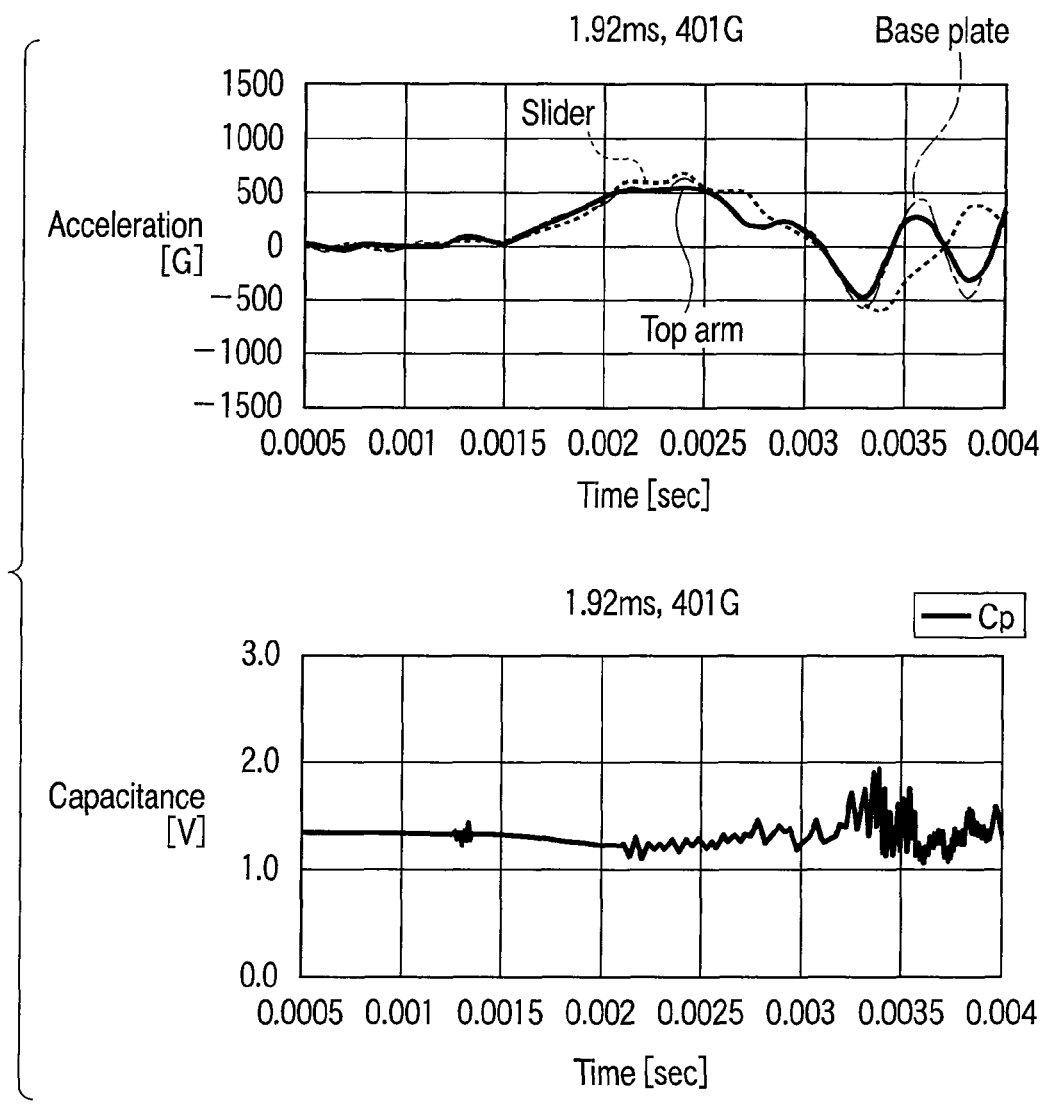

FIGS. 8A and 8B show the motion tracking of the arm, the slider and the base plate during an impact, and changes in the capacitance. The motion tracking is conducted by measuring the vibrations of the arm (top arm), the slider and the HDD base plate by use of acceleration sensors. In each of FIGS. 8A and 8B, an impact of a level that does not cause any lift-off of the slider is given to the HDD 16.

The motion tracking is conducted at the same time as the measurement of the capacitance. For this purpose, the output signal of the acceleration sensor is supplied to the control unit 11 of FIG. 1 so that the motion tracking can be performed at the same time as the measurement of the capacitance.

In the situation of FIG. 8A, the duration is 2.03 ms, and the acceleration is 419 G. Here, the arm and the base plate are vibrating in phase. However, the slider is not vibrating in phase with the arm and the base plate during the time period of 0.002 to 0.0035 (sec). Furthermore, the capacitance drastically changes during this period of time, which shows that the slider comes into contact with the disk. As a result, it is found that the slider comes into contact with the disk when the slider does not vibrate in phase with the arm and the base plate.

In the situation of FIG. 8B, the duration is 1.92 ms, and the acceleration is 401 G. In other words, an impact on the HDD of FIG. 8B is slightly smaller than that of FIG. 8A. Here, when the arm, the base plate and the slider are vibrating in phase, there is no significant change in the capacitance. However, around the time point 0.0035 (sec), the capacitance marks some change, although it is not as large as that of FIG. 8A. At this level of change in the capacitance, no contact occurs between the slider and the disk. However, the slider does not vibrate in phase with the arm and the base plate at this point. In other words, if the amount of change in the capacitance increases even when the slider does not come into contact with the disk, it can be determined that vibrations of different phases occur between the slider and the arm/base plate.

The slider, the arm and the base plate have different masses. When acceleration is produced on the HDD, the vibration cycles of the slider, the arm and the base plate differ in accordance with the acceleration. With the conventional technologies, the relationship between the vibrations of the slider, the arm and the base plate and the contact of the slider and the disk has not been found. However, as indicated in FIGS. 8A and 8B, detection of changes in the capacitance between the slider and the disk has revealed that, when there is a significant change in the capacitance, vibrations of different phases occur in the slider, the arm and the base plate, which leads to a contact of the slider and the disk.

Furthermore, because it has been revealed that the slider comes into contact with the disk when the vibrations of the slider becomes out of phase with the vibrations of the arm and the base plate, it has also been found that in the designing and manufacturing processes of the HDD structural components including the slider, the arm and the base plate, their vibration characteristics should be made to agree with one another in order to prevent the slider from coming into contact with the disk.

Figure 9A:
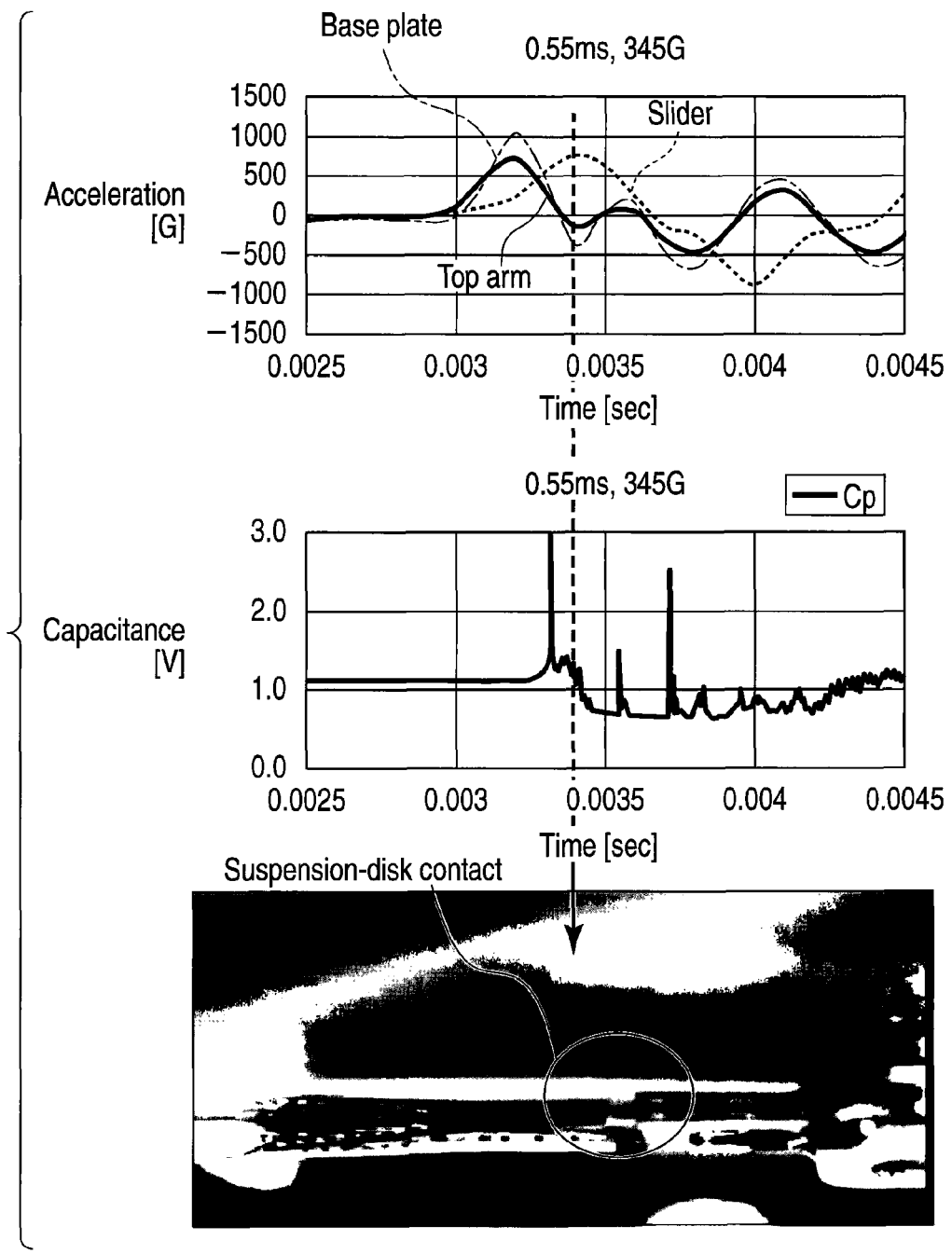

FIGS. 9A and 9B indicate the contact relationship of the suspension and the disk. Besides the contact of the slider with the disk, a contact of the suspension with the disk may occur during an impact, depending on its acceleration. With the conventional technologies, however, the timing at which the slider comes into contact with the disk has been unable to find by use of a high-speed camera or motion tracking. In contrast, according to the present embodiment, by detecting changes in the capacitance between the slider and the disk, the timings at which the suspension and the slider come into contact with the disk become distinguishable.

FIG. 9A shows a situation in which the duration of the HDD is 0.55 ms and the acceleration is 345 G. In the motion tracking time range of 0.003 to 0.0035 [sec] in which the arm and the base plate are vibrating substantially in phase but the slider is vibrating in a different phase, the first peak of the capacitance appears. The slider comes into contact with the disk at this point. Thereafter, at a point indicated in broken line at which the slider comes in opposite phase with respect to the arm and the base plate, the suspension comes into contact with the disk as shown in the high-speed camera image. In other words, with the conventional technologies, the contact timing of the slider and the suspension during an impact has been unable to find, while with the present embodiment, the contact timing can be found by detecting changes of the capacitance in chronological manner in addition to the motion tracking.

FIG. 9B shows a situation in which the duration of the HDD is 0.96 ms and the acceleration is 323 G. In the motion tracking time range of 0.0045 to 0.005 [sec] in which the arm and the base plate are vibrating substantially in phase but the slider is vibrating in a different phase, the first peak of the capacitance appears. The slider comes into contact with the disk at this point. Thereafter, at the timing indicated in a broken line at which the slider comes in an opposite phase with respect to the arm and the base plate, the base plate comes into contact with the disk as shown in the high-speed camera image.

According to the above embodiment, by detecting changes in the capacitance between the slider and the disk in a time-series, a contact of the slider with the disk can be detected even when a slider lift-off does not occur. Hence, the behaviors of the slider, the suspension and the arm during an impact can be accurately observed.

Furthermore, dynamic and quick changes in the capacitance that are produced because of the behavior, or in other words, mechanical vibrations of the slider are converted to voltage changes, and thereby the behavior of the slider can be readily and accurately observed on the order of nanometers, without employing any costly, special measurement device.

Moreover, by chronologically recording the changes of the capacitance as voltage changes, frequency components of the behavior of the slider may be analyzed, for example, by general fast Fourier transformation (FFT).

According to the above embodiment, the capacitance detector 13 detects changes of the capacitance by use of an envelope detector. However, the embodiment is not limited thereto.

FIG. 10 shows another embodiment of the capacitance detector 13, incorporating a phase detector. In FIG. 10, the same components as those of FIG. 2 are given the same reference numerals, and therefore the explanation focuses on differences.

In FIG. 10, the outputs signal of the BPF 13b is supplied as a reference signal to one input terminal of a phase detector 13m by means of an amplifier 13l. Further, an output signal of the amplifier 13h is supplied to the other input terminal of the phase detector 13m by means of a phase adjustment circuit 13n. The phase detector 13m compares the phase of the output signal of the phase adjustment circuit 13n with that of the reference signal, and outputs a voltage pulse in accordance with the phase difference. The output signal of the phase detector 13m is supplied to the LPF 13j. The phase adjustment circuit 13n is adjusted in such a manner that the phase difference output by the phase detector 13m when disconnecting the HDD 16 from the terminal 13e and the terminal 13f and short-circuiting between these terminals becomes, for example, 0°.

The same effect as the above embodiment can be attained from this modification.

Furthermore, both envelope detection and phase detection may be incorporated to detect changes in both amplitude and phase so that the detection accuracy of the capacitance can be further improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vibration characteristics measurement apparatus comprising:
    a signal source configured to generate a signal of a frequency higher than a vibration frequency of a slider of a hard disk drive, said signal being supplied to one of the slider and a disk of the hard disk drive;
    a detector configured to detect a signal output from the other of the slider and the disk and output a change in a capacitance between the slider and the disk as a voltage when the hard disk drive receives an impact, wherein the detector is a phase detector that conducts detection based on the signal output from the signal source and the signal output from the other of the slider and the disk;
    a band-pass filter connected to the signal source;
    a phase adjustment circuit that receives the signal output from the other of the slider and the disk; and
    an amplifier connected to the band-pass filter;
    wherein the phase detector detects a phase difference between an output signal of the amplifier and an output signal of the phase adjustment circuit.

2. The apparatus according to claim 1, wherein:
    the detector is an envelope detector.

3. The apparatus according to claim 1, further comprising:
    a high-speed camera configured to take an image of the slider and the disk when the hard disk drive receives the impact.

4. The apparatus according to claim 1, wherein:
the signal source generates a signal of a frequency 50 to 100 times higher than the vibration frequency of the slider.

5. The apparatus according to claim 4, wherein:
the signal source generates a signal of 5 to 10 MHz.

6. The apparatus according to claim 1, further comprising:
an impact testing machine configured to give an impact to the hard disk drive, wherein the impact testing machine includes:
a stage on which the hard disk drive is mounted, said stage being dropped from a predetermined height; and
a control unit configured to control the impact testing machine, and the control unit receives and processes an output signal of the detector in a test.

* * * * *